United States Patent [19]

Herrmann et al.

[11] Patent Number: 5,080,845
[45] Date of Patent: Jan. 14, 1992

[54] METHOD OF REMOVING IMPURITIES FROM POLYMERIC SYNTHETIC PLASTICS MATERIALS AND AN APPARATUS FOR CARRYING OUT THE METHOD

[75] Inventors: Heinz Herrmann, Stuttgart; Dieter Rath, Esslingen, both of Fed. Rep. of Germany

[73] Assignee: Werner & Pfleiderer, GmbH, Fed. Rep. of Germany

[21] Appl. No.: 439,883

[22] Filed: Nov. 21, 1989

[30] Foreign Application Priority Data

Nov. 30, 1988 [DE] Fed. Rep. of Germany ....... 3840293

[51] Int. Cl.$^5$ ............................................ B29C 47/76
[52] U.S. Cl. .................................. 264/101; 159/2.2; 210/634; 264/141; 425/203; 425/204; 425/205
[58] Field of Search ................ 264/101, 102, 141; 425/203, 204–205, 209; 159/2.2, 2.3; 210/634

[56] References Cited

U.S. PATENT DOCUMENTS

| | | | |
|---|---|---|---|
| 3,683,511 | 8/1972 | Johnson et al. | 34/9 |
| 3,738,409 | 6/1973 | Skidmore | 425/203 |
| 3,917,507 | 11/1975 | Skidmore | 264/102 |
| 3,963,558 | 6/1976 | Skidmore | 264/102 |
| 4,063,718 | 12/1977 | Koch | 425/205 |
| 4,065,532 | 12/1977 | Wild et al. | 425/203 |
| 4,094,942 | 6/1978 | Nakai et al. | 264/102 |
| 4,686,279 | 8/1987 | Nagtzaam et al. | 425/203 |
| 4,767,303 | 8/1988 | Sakakura et al. | 425/203 |
| 4,871,460 | 10/1989 | Robin et al. | 210/634 |
| 4,900,494 | 2/1990 | Wobbe | 425/203 |

FOREIGN PATENT DOCUMENTS

| | | | |
|---|---|---|---|
| 2107927 | 7/1972 | Fed. Rep. of Germany | 425/204 |
| 2304088 | 8/1973 | Fed. Rep. of Germany | |
| 1576156 | 7/1969 | France | |
| 62-273821 | 11/1987 | Japan | 425/203 |
| 1167850 | 10/1969 | United Kingdom | 425/204 |

OTHER PUBLICATIONS

Anders, "Plastverarbeiter", 32nd vol. 1981, No. 7, pp. 811–818.

Primary Examiner—Jeffery Thurlow
Attorney, Agent, or Firm—Laff, Whitesel, Conte & Saret

[57] ABSTRACT

The removal of impurities, for example monomeric low-molecular substances, solvents or the like, from polymeric synthetic plastics materials takes place by the admixture of extraction gas in a first extruder in a supercritical state. The mixture is transferred to a second extruder where, in a first separating zone, and by a counter-current method, it is cleansed of the major part of the extraction gas containing the impurities, this being passed through a discharge orifice. Separation of any residue takes place in a vacuum zone on the downstream side. The high pressure in the first extruder is maintained by a counter-pressure valve in the connecting pipe between the first and second extruders. By the separation of contaminated extraction gas from molten synthetic plastics material in a closed space, namely the second extruder, it is possible to achieve an ordered dissipation of extraction gas on the one hand and molten synthetic plastics material on the other hand.

2 Claims, 1 Drawing Sheet

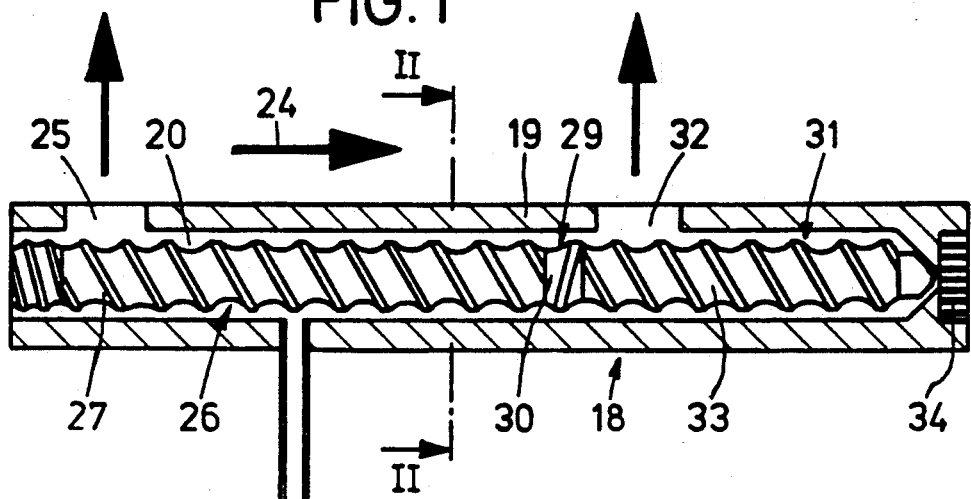
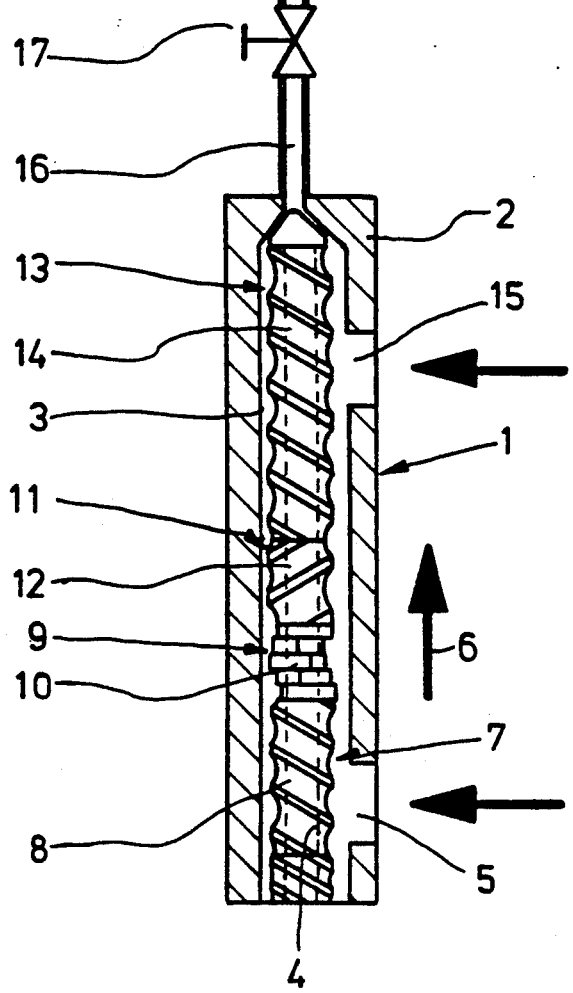
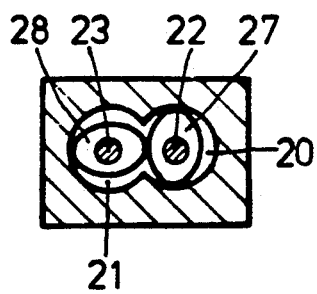

METHOD OF REMOVING IMPURITIES FROM POLYMERIC SYNTHETIC PLASTICS MATERIALS AND AN APPARATUS FOR CARRYING OUT THE METHOD

FIELD OF THE INVENTION

The invention relates to a method of removing impurities, such as monomeric low-molecular substances, solvents or the like, from polymeric synthetic plastics materials, a synthetic plastics material which contains impurities being melted under pressure after which the molten material is mixed with an extraction gas in the supercritical state, the mixture of molten material and gas being pressure-relieved and thereby separated into molten material which is substantially free from impurities and into gas which contains the impurities. Furthermore, the invention relates to an apparatus for carrying out the method of removing impurities, such as monomeric low-molecular substances, solvents or the like, from polymeric synthetic plastics materials, with an extruder containing at least one worm, the extruder comprising an intake aperture for synthetic plastics material containing impurities, a melting zone downstream thereof and, downstream of the melting zone, a mixing zone into which discharges a feed for extraction gas which is in the supercritical state, the mixing zone being followed by an arrangement for separating the molten material from the gas which contains the impurities.

BACKGROUND OF THE INVENTION

A method and an apparatus of the types mentioned at the outset are known from European published patent application 0 233 661. This provides a single-worm extruder having a fusion zone in which synthetic plastics material containing impurities is fused into a molten state. Downstream of the fusion zone is a mixing zone into which discharges an extraction gas supply pipe. This gas is supplied in a super-critical state, i.e. pressure and temperature are close to the critical point and may even be slightly above or below it. Preferably, pressure and temperature should settle down just above the critical point. The temperature is in the region of the temperature of the molten plastics material. Downstream of the mixing zone is a relieving zone or discharge zone, i.e. the molten material is delivered from the extruder at atmospheric pressure, an abrupt relief of tension taking place. As this happens, the gas containing the impurities ought to separate from the molten material. This method and this apparatus are altogether unsatisfactory in view of the purity which results and with regard to the possibility of gas recovery.

Known from GDR patent 69 099 are a method and an apparatus for the separation of solvents from hot molten synthetic plastics materials. In this case, two uniform-pitch twin-worm extruders are disposed serially. The first extruder comprises a cooling zone which is separated by a packing or a damming element from a downstream fusion zone. Immediately in front of the gasket, a spray-in aperture opens out into the cooling zone through which is sprayed hot molten synthetic plastics material containing solvent. Some of the solvent is condensed out and is drawn off on the downstream side through an extraction orifice. In the fusion zone, the synthetic plastics material which still contains solvent residues is again melted, the necessary pressure being established by a throttle disposed in the connecting pipe between the extruders. The second extruder has in turn, at its upstream end, a cooling zone which is separated by damming elements or gaskets from following heated degasification zones. The molten synthetic plastics material still containing residual solvent is sprayed into this cooling zone in the vicinity of the gasket, parts of the solvent being condensed in the same way and being drawn off through an extraction orifice on the upstream side. The synthetic plastics material is passed through the gasket into the vacuum zones where the rest of the solvent is withdrawn.

The so-called high-pressure extraction to which the present invention refers is generally known and is for example described in detail in the publication of Krupp Industrietechnik GmbH—Krupp Research Institute—114–440 d 1068520.

SUMMARY OF THE INVENTION

It is an object of the invention to develop a method of the type mentioned at the outset which enables a satisfactory removal of impurities from the contaminated substance and a reliable recovery of the extraction gas to be achieved. It is a further object of the invention to provide an apparatus of the type mentioned at the outset which enables a satisfactory removal of impurities from the contaminated substance and a reliable recovery of the extraction gas to be achieved.

According to the invention, in the case of a method of the type mentioned at the outset, this object is achieved by the features that the mixing of molten material and gas takes place at supercritical pressure in an enclosed space and that the mixture is transferred to a further space where it is separated, and that the gas with the impurities on the one hand and the synthetic plastics material which is substantially free from impurities on the other hand are withdrawn from the space at locations which are spaced apart from each other. In the case of an apparatus of the type mentioned at the outset, this object is achieved by the features that the arrangement is constituted by a second extruder containing at least one drivable worm and connected to the first extruder via a connecting line which discharges into a separating zone of the second extruder and that the mixing zone in the first extruder is sealed against the melting zone and against the second extruder and that the separating zone of the second extruder is on the upstream side of a means of discharging the synthetic plastics material, provided with at least one discharge orifice for extraction gas. According to the invention, it is important that the admixture of the gas take place in the supercritical state and under clearly defined pressure conditions, so that the extraction gas is also reliably mixed with the molten material, in other words so that the extraction process takes place reliably. For this, it is important that by maintaining the pressure constant during the mixing process, also the mixing time and the dwell time of the gas in the molten synthetic plastics material can be influenced. By means of a suitable relief valve on the downstream side of the mixing zone, or by means of a suitable throttle, this can be achieved. The extraction gas which contains the impurities can then be withdrawn from the second extruder in gaseous form.

Further features, advantages and details of the invention will become apparent from the ensuing description of an exemplary embodiment taken in conjunction with the highly diagrammatic drawings.

BRIEF DESCRIPTION OF THE DRAWINGS

FIG. 1 is a plan view of a horizontal cross-section through an apparatus according to the invention and FIG. 2 is a vertical section through a part of the apparatus taken on the section line II—II in FIG. 1.

DESCRIPTION OF THE PREFERRED EMBODIMENT

A first extruder 1 comprises a housing 2 with a bore 3. In this latter there is a shaft 4 which can be rotatingly driven by a drive, not shown. In the housing 1 is an intake aperture 5 for synthetic plastics material, in fact particularly for polymeric synthetic plastics material containing impurities. In the direction 6 of conveyance, in other words downstream of this intake aperture 5 there is an induction zone 7 in which a portion 8 of worm winding is rotationally rigidly mounted on the shaft 4. The induction zone 7 is followed by a melting zone 9 which is also referred to as a plasticising zone. Conventionally, such a melting zone 9 contains what are referred to as kneading discs 10 which are generally known and conventionally used in practical situations.

The melting zone 9 is followed by a gasket 11 constituted by a back feed screw thread 12. Also such packings or gaskets are generally known in practical situations and are resistant to melting. Further on the downstream side, in other words in the direction of conveyance 6, there is a mixing zone 13 in which the shaft 4 of the extruder 1 is rotationally rigid with a portion 14 of worm thread and which may possibly comprise further known mixing means. Discharging into this mixing zone 13 is a feed 15 for extraction gas in a supercritical state. In the conveyance direction 6, at the end of the first extruder 1, there emerges from the mixing zone 13 a connecting pipe 16 in which is disposed a counter-pressure valve 17. The connecting pipe 16 leads to a second extruder 18 which is constructed as a uniform-pitch twin-worm extruder. In its housing 19 are two mutually parallel and partially mutually penetrating bores 20, 21 in which there are two likewise mutually parallel shafts 22, 23 which are driven in the same direction, in other words in the same direction of rotation, by a drive, not shown. The second extruder 18 has at its upstream end (in relation to the direction of conveyance 24) a discharge orifice 25 for extraction gas. This discharge orifice 25 is constructed at one end of a separating zone 26 in which portions 27, 28 of worm thread are rotationally rigidly disposed on the shafts 22, 23 and mesh tightly with each other. This separating zone 26 is occluded on the downstream side by a melt-proof gasket 29 which consists of a back feed screw thread 30.

Downstream of the melt-proof gasket 29, in the direction of conveyance 24, is a vacuum zone 31 provided with a vacuum discharge orifice 32 through which residual gas is able to escape. In the vacuum zone, the shafts 22, 23 are in turn provided with portions 33 of worm thread.

At the end of the second extruder 18 which is downstream in the direction of conveyance 24 there is a delivery means 34, possibly in the form of a granulating apparatus, which is provided for the cleansed polymeric plastics material.

As the drawing shows, the connecting pipe 16 discharges into the separating zone 26 substantially in the middle between the discharge orifice 25 and the melting-proof gasket 29.

Admixture of the supercritical gas into the molten synthetic plastics material in the mixing zone 13 of the first extruder 1 takes place under clearly defined pressure and time conditions, in other words in an extremely intensive manner, because there is in the connecting pipe 16 the counter-pressure valve 17 which may be a pressure-reducing valve, a pressure-relieving valve or even a throttle, so that the pressure corresponding to the supercritical pressure of the extraction gas can be maintained in the mixing zone 13. This is particularly important because the viscosity of the molten synthetic plastics material in the mixing zone 13 is drastically lowered by the admixture of the extraction gas. If no suitable counter-pressure valve 17 is provided, the correspondingly very high pressure in the mixing zone 13 could not otherwise be maintained. If for example $CO_2$ is used as the extraction gas, then at a temperature of 75° C., a pressure of about 165 bars must be selected in order to reach the supercritical range. As a result of these measures, it is possible on the one hand to maintain the necessary pressure and on the other hand to carry out a continuous or at least almost continuous operation.

Since the connecting pipe 16 discharges into the separating zone 26 substantially midway between the discharge orifice 25 and the melt-proof gasket 29, the gas flows against the direction of feed 24, in other words upstream, to the discharge orifice 25. By reason of the counter-current separation in the separating zone 26 of the second extruder 18, it is possible to extract in an orderly manner the gas which by virtue of the extraction process in the mixing zone 13 of the first extruder 1, has largely absorbed the impurities originally contained in the synthetic plastics material.

The molten synthetic plastics material substantially cleansed of gas and impurities flows through the melt-proof gasket 29 into the vacuum zone 31, where it is completely cleansed of residual gas and residual impurities, which are extracted through the vacuum discharge orifice 32. The ordered dispersal of the extraction gas carrying the impurities, on the one hand, and of the now cleansed molten synthetic plastics material on the other hand is to a great extent made possible by the fact that separation from the molten synthetic plastics material of the gas carrying the impurities actually takes place in the second extruder 18, in other words in a closed space.

We claim:

1. A method of removing impurities, such as monomeric low-molecular substances, solvents or the like, from polymeric synthetic plastics materials, comprising the following steps:

melting under pressure a synthetic plastics material which contains impurities to provide a molten material;

mixing said molten material in a first space which is closed with an extraction gas, said extraction gas being in a supercritical state and having a supercritical pressure, said first space being closed and maintaining said supercritical pressure in said first space during said mixing;

transferring said mixture of molten material and gas to a second space which is separate from said first space;

pressure-relieving the mixture of molten material and extraction gas in said second space to separate molten material which is substantially free from impurities from extraction gas which contains the impurities; and withdrawing from said second space from one location the extraction gas with the impurities and from another location the synthetic plastics material which is substantially free from impurities.

2. A method according to claim 1, comprising vacuum treating the molten material which is substantially free from impurities and extraction gas.

* * * * *